March 22, 1966     R. O. BARRY     3,241,302
MOWING APPARATUS

Filed Nov. 2, 1964                                   4 Sheets-Sheet 1

INVENTOR.
ROBERT O. BARRY
BY
*Dunlap & Laney*
ATTORNEYS

March 22, 1966 R. O. BARRY 3,241,302
MOWING APPARATUS
Filed Nov. 2, 1964 4 Sheets-Sheet 2
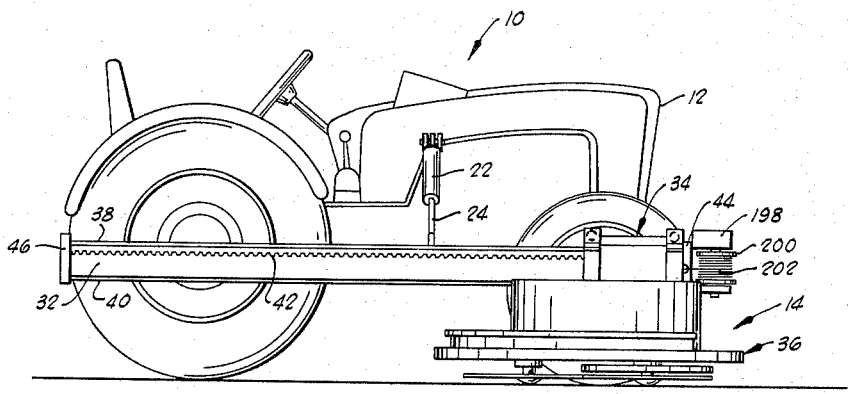
Fig. 2
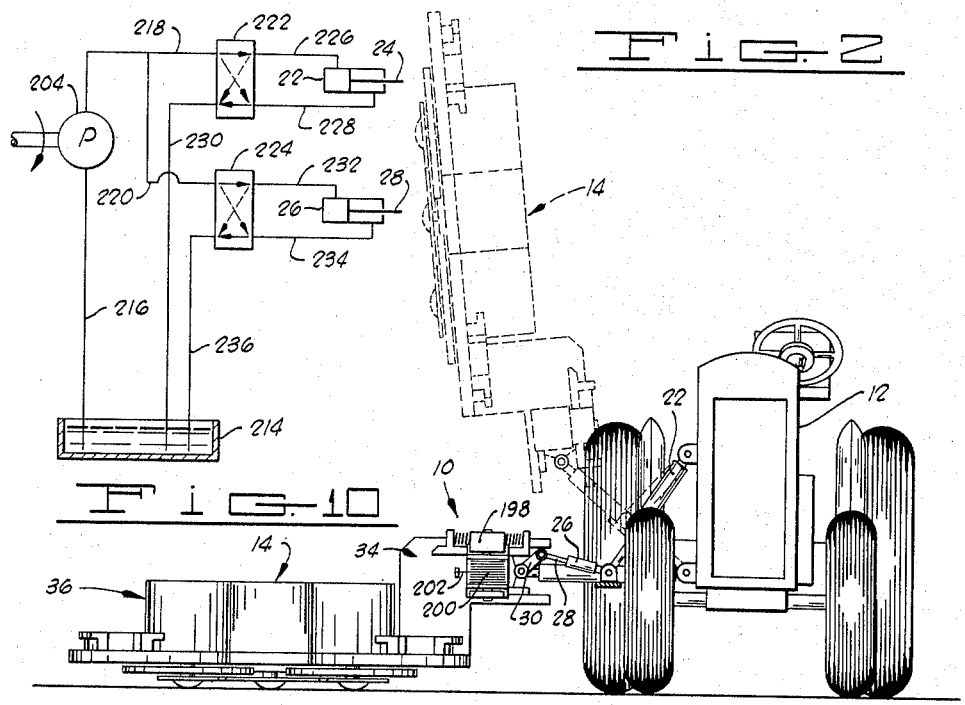
Fig. 10
Fig. 3
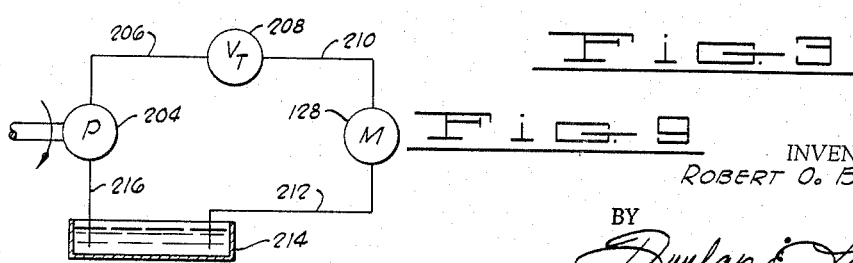
Fig. 9
INVENTOR.
ROBERT O. BARRY
BY
Dunlap & Laney
ATTORNEYS March 22, 1966

R. O. BARRY
MOWING APPARATUS 3,241,302

Filed Nov. 2, 1964

INVENTOR.
ROBERT O. BARRY

BY
Dunlap & Laney
ATTORNEYS

March 22, 1966 R. O. BARRY 3,241,302
MOWING APPARATUS
Filed Nov. 2, 1964 4 Sheets-Sheet 4
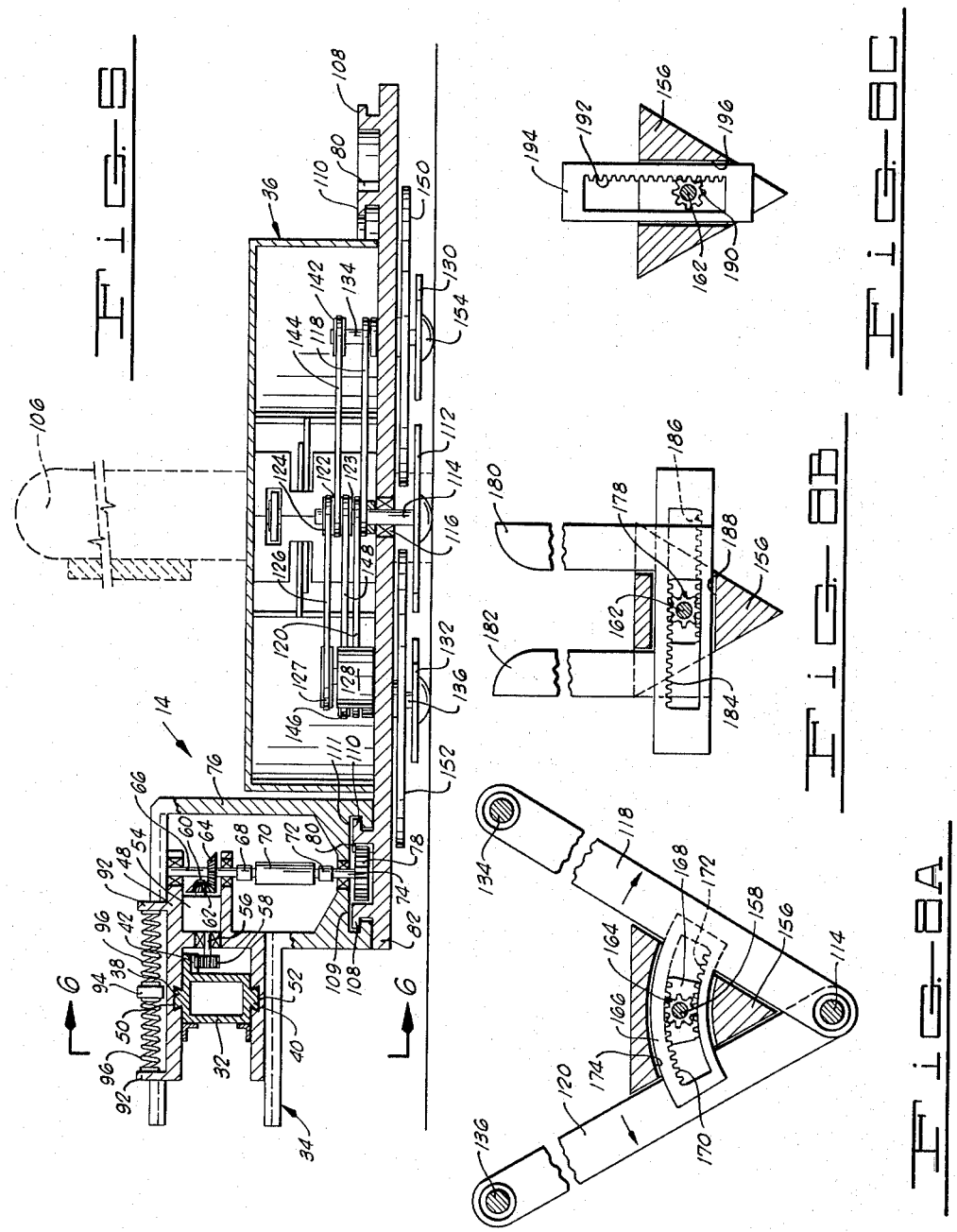
INVENTOR.
ROBERT O. BARRY
BY
*Dunlap & Laney*
ATTORNEYS

United States Patent Office 3,241,302
Patented Mar. 22, 1966

3,241,302
MOWING APPARATUS
Robert O. Barry, 3621 NW. 65th Terrace,
Oklahoma City, Okla.
Filed Nov. 2, 1964, Ser. No. 408,140
13 Claims. (Cl. 56—25.4)

This invention relates generally to improvements in mowing apparatus. More particularly, but not by way of limitation, this invention relates to an improved mower for use in mowing around posts and the like.

For many years, the problem of maintaining fence rows free of grass, weeds, and the like has existed. If the fence posts are spaced a sufficient distance apart, it has been possible, by performing a large amount of maneuvering, to mow the area between posts with mechanical mowers presently available. However, the task of mowing grass or weeds adjacent posts has had to be performed manually. Maintaining fence rows and the like free of grass and weeds is desirable not only from the standpoint of making the area more attractive, but also to reduce the possibility of fires and, further, to reduce the possibility of damage to posts due to the accumulation of weeds and grass thereabout in the event that a fire should occur.

Various types of apparatus have been constructed in the past for the purpose of clearing fence rows. Such apparatus has not been accepted commercially nor has any of these devices proved to be entirely satisfactory. None of the previously constructed devices have been capable of mowing completely around the post, and most have been of the type that straddles the fence, thereby eliminating any possibility of using these devices for mowing around tall posts or around telephone or power line poles.

During the past several years, the use of guard rails supported by a plurality of spaced posts along highway right-of-ways has increased considerably. There is no commercially available equipment that is satisfactory for clearing the area around such posts and, consequently, all work of this type is performed by hand. Due at least in part to the increasing wage scale of the laborers used to clear grass around the posts, it has become almost prohibitive to perform the mowing operation as frequently as is necessary and certainly as frequently as is desirable.

This invention contemplates generally the provision of mowing apparatus for mechanically mowing around and between posts, poles, and the like. More specifically, the apparatus proposed by this invention includes an elongated track attached to a vehicle, a support member mounted for movement along the track, and a base member carrying at least one mower blade mounted on the base member for performing the mowing operation. The base member is rotatably mounted, whereby engagement of the apparatus with a post or the like causes the base member and support member to move along the track as the vehicle progresses forwardly and the base member is caused to rotate relative to the support member and track, carrying the mower blade around the post.

One object of the invention is to provide improved mowing apparatus for mowing around posts or the like.

Another object of the invention is to provide an improved mowing apparatus carried by a self-propelled vehicle for mowing around posts or the like while the vehicle progresses forwardly.

A further object of the invention is to provide an improved mowing apparatus that quickly and efficiently mows around posts or the like and the space between adjacent posts as the vehicle progresses forwardly.

Still another object of the invention is to provide an improved mowing apparatus for mowing around posts or the like regardless of the height of such posts.

A still further object of the invention is to provide an improved mowing apparatus that can be used to mow around posts or the like of various diameters without manual adjustment.

The foregoing and additional objects and advantages of the invention will become more apparent as the following detailed description is read in conjunction with the accompanying drawing wherein like reference characters denote like parts in all views and wherein:

FIG. 2 is a side elevation view of the mowing apparatus of FIG. 1;

FIG. 3 is a front elevation view of the mowing apparatus of FIG. 1;

FIG. 5 is an enlarged cross-sectional view taken substantially along the line 5—5 of FIG. 4;

Figure 1:
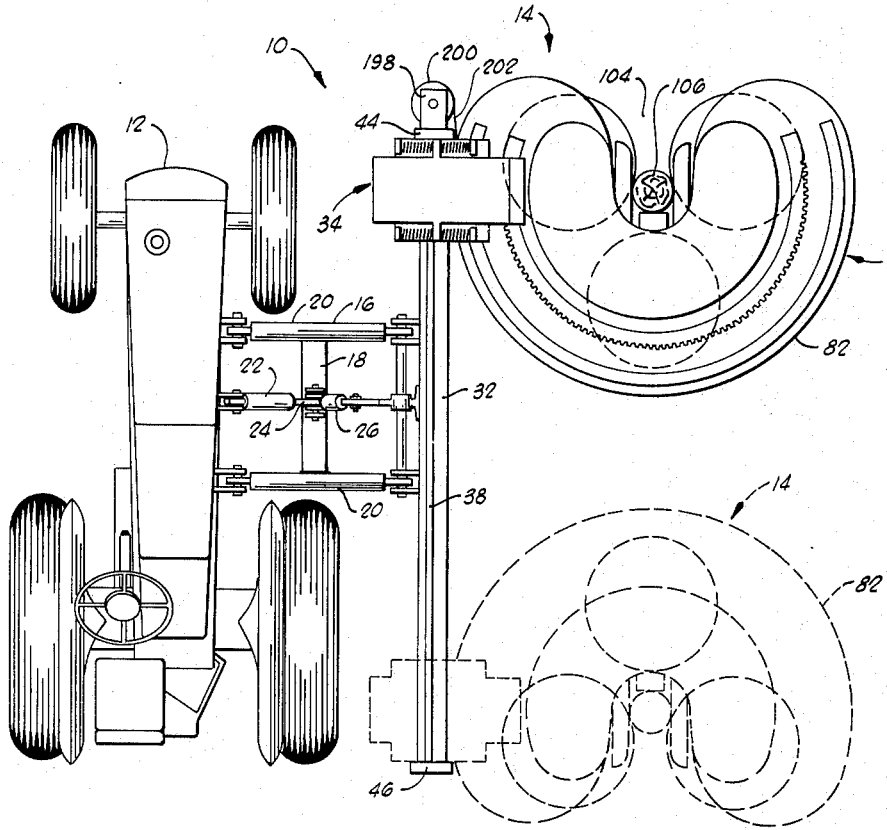
FIG. 1 is a top plan view of mowing apparatus constructed in accordance with the invention.
Figure 7:
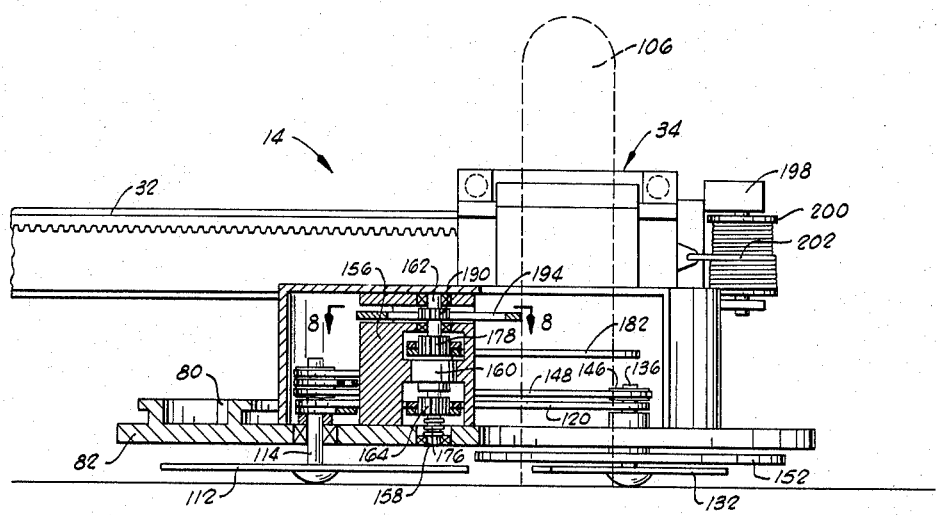
FIG. 7 is a view partly in cross-section and partly in elevation taken substantially along the lines 7—7 of FIG. 4.

FIGS. 8A, 8B, and 8C constitute an exploded view shown partly in cross-section and partly in elevation and taken substantially along the line 8—8 of FIG. 7;

FIG. 9 is a schematic diagram of a hydraulic circuit used to actuate a hydraulic motor for driving the mower blades of the mowing apparatus shown in FIG. 1; and, FIG. 10 is a schematic diagram of a hydraulic circuit used in controlling the position of the mowing apparatus of FIG. 1.

Referring to the drawing and to FIGS. 1, 2, and 3 in particular, shown therein and generally designated by the reference character 10 is one embodiment of mowing apparatus constructed in accordance with the invention. As shown therein, a self-propelled vehicle 12, illustrated as being a tractor, carries a mowing attachment 14.

The mowing attachment 14 is connected with the tractor 12 by a support frame 16 comprising a spacer member 18 holding a pair of legs 20 in spaced relation. The legs 20 are pivotally attached at one end with the tractor 12 and at the other end with the mowing attachment 14.

A hydraulic cylinder 22 has one end pivotally attached to the tractor 12. A reciprocating piston rod 24 extending from the other end of the cylinder 22 is pivotally attached to the member 18. The hydraulic circuit for operating the cylinder 22 and rod 24 will be discussed more fully in connection with the description of FIG. 10.

A second hydraulic cylinder 26, which may be more clearly seen in FIG. 3, has one end pivotally attached to the member 18 and has the free end of a reciprocating piston rod 28 extending from the cylinder 26, pivotally connected with a lever arm 30. The lever arm 30 is rigidly attached to a track 32 which comprises a portion of the mowing attachment 14. The hydraulic circuit controlling the cylinder 26 will also be discussed in connection with the description of FIG. 10.

Generally, the function of the hydraulic cylinder 22 is to position the mowing attachment 14 vertically with respect to the surface of the ground and to raise the mowing attachment 14 into an elevated position (shown in dash-lines in FIG. 3) wherein it can be conveniently transported when not in use. The function of the cylinder 26 is to control the angular position of the mowing attachment 14, whereby the mowing attachment 14 can be disposed in substantially parallel relationship with the surface of the ground even when such surface is at an angle relative to the surface on which the tractor 12 is operating.

Figure 6:
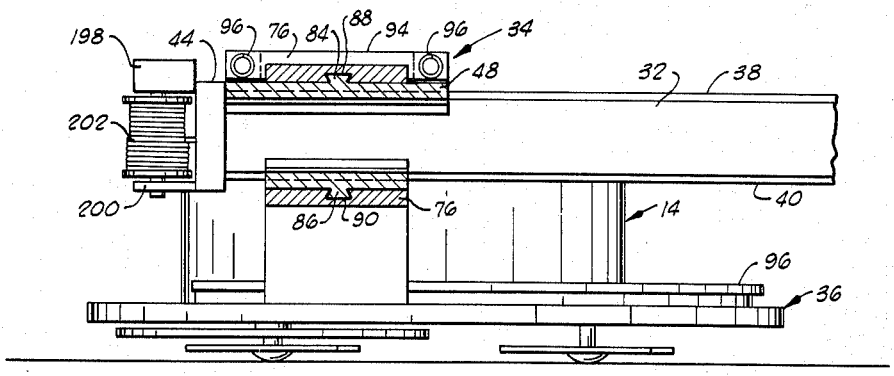
FIG. 6 is a cross-sectional view taken substantially along the line 6—6 of FIG. 5.
Figure 4:
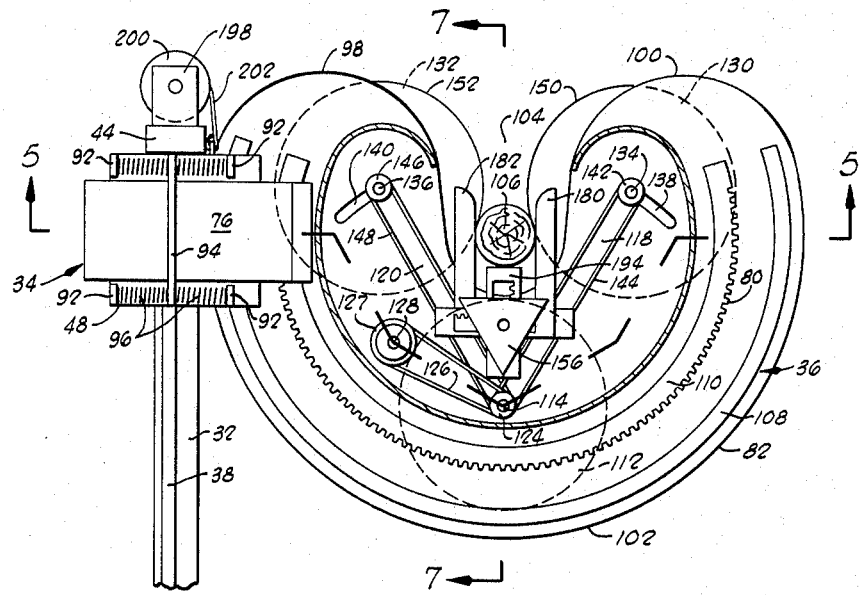
FIG. 4 is an enlarged top plan view of a portion of the mowing apparatus of FIG. 1, having the cover removed therefrom to show more clearly the details of construction.

As shown more clearly in FIGS. 4, 5 and 6, the mowing attachment 14 includes a support assembly 34 slidingly positioned on the track 32 and connecting the track 32 with a mower assembly 36. The track 32 is provided with upper and lower dove-tail portions 38 and 40, respectively, with an elongated toothed portion 42 (shown more clearly in FIG. 2), and with front and rear stops 44 and 46, respectively.

The toothed portion 42 extends substantially the entire length of the track 32 and may be a separate rack gear suitably attached to the track 32. As shown most clearly in FIG. 5, the track 32 preferably has a rectangular cross-section to provide the maximum strength to weight ratio thereby providing the maximum rigidity in the track 32 while maintaining the weight thereof as low as possible.

The support assembly 34 (see FIG. 5) includes an inner support member 48 having a pair of dove-tail grooves 50 and 52 sized to slidingly receive the upper and lower dove-tail portions 38 and 40, respectively, of the track 32. The arrangement of the inner support member 48 and the track 32 is such that the inner support member 48 is slidingly received thereon for movement along the track 32 in a direction parallel to the longitudinal axis of the tractor 12.

A gear box 54 is mounted on the inner support member 48 and has a first shaft 56 carrying a spur gear 58. The gear box 54 is of the conventional type and includes internally mounted gears (not shown) to provide the desired ratio of input to output speeds. If desired, the gear box 54 may be of the selective speed type whereby the ratio can be varied.

The spur gear 58 is in engagement with the toothed portion 42 of the track 32 for purposes which will be explained more fully hereinafter. A second shaft 60 extends from the opposite end of the gear box 54 and has a mitre gear 62 mounted thereon. The mitre gear 62 is in engagement with a second mitre gear 64 mounted on the upper end of a shaft 66.

The shaft 66 is suitably journalled in the inner support member 48. The lower end of the shaft 66 is connected with a universal joint 68 which is connected with one end of a telescoping shaft 70. The other end of the telescoping shaft 70 is connected with a second universal joint 72.

The universal joint 72 is connected with a shaft 74 suitably journalled in an outer support member 76 of the support assembly 34. A spur gear 78 mounted on the lower end of the shaft 74 is in engagement with a toothed portion 80 of a rotatable base member 82.

The outer support member 76 is slidingly mounted on the inner support member 48. The sliding relationship therebetween is attained by upper and lower tongue portions 84 and 86 on the inner support member 48 that are received in mating grooves 88 and 90, respectively, in the outer member 76, as shown most clearly in FIG. 6. It can be appreciated that the sliding movement provided between the inner and outer support members 48 and 76 will be in a direction perpendicular to the length of the track 32 or laterally as compared to the longitudinal axis of the tractor 12.

Lateral movement of the outer support member 76 relative to the inner support member 48 is provided from a center position as illustrated in FIG. 5 for a given distance in either direction therefrom. In order to maintain the outer support member 76 in a centered position relative to the inner support member 48, the inner support member 48 has been provided with a pair of upwardly extending lugs 92 disposed on each side of the outer support member 76 and spaced relative to an upstanding flange 94 carried by the outer support member 76. A pair of springs 96 disposed on each side of the outer support member 48, as may be seen more clearly in FIG. 5, are arranged to exert a force between the upstanding flange 94 and the lugs 92 to retain the outer support member 76 centered.

The base member 82 comprises a relatively flat and generally U-shaped member (FIG. 4) having a pair of leg portions 98 and 100 connected by a base portion 102. A slot or opening 104 is provided between the leg portions 98 and 100. The opening 104 is sized to receive a post or pole 106.

Projecting upwardly from the upper surface of the base member 82 is a pair of concentric and oppositely disposed annular flanges 108 and 110 (FIG. 5). The toothed portion 80 forms a portion of the annular flange 110. The annular flange portions 108 and 110 are arranged to be received in corresponding grooves 109 and 111 in the outer support member 76 to support the base member 82 for rotation about the post 106 relative to the support assembly 34.

A rotary mower blade 112 is mounted on a shaft 114 journalled in the base plate 82 by one or more bearings 116. Rotatably mounted on the shaft 114 above the base member 82 is a pair of blade support arms 118 and 120. Mounted for rotation with the shaft 114 above the blade support arms 118 and 120 are pulleys 122, 123, and 124. A single, triple groove pulley may be used if desired instead of the pulleys 122, 123, and 124. A drive belt 126 which may be a cog-belt or V-belt extends from the pulley 124 to a pulley 127 mounted on a hydraulic motor 128.

The hydraulic motor 12 is securely attached to the base member. The hydraulic circuit for actuating the hydraulic motor 128 is illustrated schematically in FIG. 9 and will be described more fully in connection therewith. A suitable gasolene or electric motor may be used instead of the hydraulic motor 128, but the hydraulic motor is preferred because of its low profile and the readily available hydraulic power supply.

Second and third mower blades 130 and 132 are rotatably mounted on shafts 134 and 136, respectively, carried in the free ends of the blade support arms 118 and 120. As may be seen more clearly in FIG. 4, the shafts 134 and 136 extend through arcuate slots 138 and 140 in the leg portions 100 and 98, respectively, of the base member 82. The arcuate slots 138 and 140 each have a center line forming a portion of the circumference of the circle drawn from the center of the shaft 114 so that the distance from the shaft 114 to the shafts 134 and 136 remains constant.

A pulley 142 (see also FIG. 5) is mounted on the upper end of the shaft 134 to accommodate a drive belt 144 extending from a pulley 122 mounted on the shaft 114. A pulley 146 is mounted on the upper end of the shaft 136 to accommodate a drive belt 148 which extends from the pulley 146 to the pulley 123 mounted on the shaft 114. The arrangement is such that rotation of the hydraulic motor 128 transmits rotation to the shaft 114 and, by virtue of the pulleys 122 and 123, rotates the shafts 134 and 136 and the blades 130 and 132.

Blade covers or shields 150 and 152 are rotatably mounted on the shafts 134 and 136, respectively, and are disposed below the base member 82. As can be seen most clearly in FIG. 4, the blade shields 150 and 152 extend partially into the opening 104 between the leg portions 98 and 100 of the base member 82.

A frusto-spherical protective cap 154 (FIG. 5) is attached to each of the mower blades. The caps 154 are disposed on the blades in a position wherein the caps 154 will engage the ground prior to the engagement thereof by any of the blades. In the normal operating position of the mower assembly 36, the caps 154 will not be in engagement with the ground.

As shown in FIG. 7 a vertical mounting member 156 is attached to the upper surface of the base member 82 and projects upwardly therefrom. The member 156 has a triangular cross-section and is disposed between the blade support arms 118 and 120. A shaft 158 has its lower end suitably journalled in the base member 82 and has its upper end attached to a clutch 160 mounted in the member 156. A second shaft 162 has its lower end attached to the clutch 160 and its upper end journalled in the member 156, thereby placing the shafts 158 and 162 generally in end-to-end relationship. The clutch 160 is of the uni-directional type, i.e., rotation of the shaft 158 is transmitted through the clutch 160 to the shaft 162, but, if an attempt is made to rotate the shaft 162, the clutch locks preventing rotation of either the shaft 162 or the shaft 158.

A spur gear 164 is mounted on the shaft 158 and is in engagement with radially extending arm portions 166 and 168 on the blade support arms 118 and 120, respectively. As shown more clearly in FIG. 8A, the radial arms 166 and 168 are provided with oppositely disposed toothed portions 170 and 172, respectively, engaged with the spur gear 164. The radial portions 166 and 168 operate in the arcuate slot 174 in the member 156. As the arms 118 and 120 are moved either relatively together or relatively apart, the spur gear 164 is caused to rotate, rotating the shaft 158. A spring 176 (FIG. 7) encircles the lower portion of the shaft 158 and has one end attached to the shaft 158 and the other end attached to the base member 82 so that the arms 118 and 120 are constantly biased toward each other and the blade shields 150 and 152 are biased into the opening 104 (FIG. 4).

A spur gear 178 (FIG. 7) is mounted on the lower end of the shaft 162. As shown in FIG. 8B, a pair of side thrust arms 180 and 182 are each provided with a toothed portion 184 and 186, respectively, disposed in engagement with the spur gear 178 and operating in a slot 188 extending through the member 156. The arrangement is such that rotation of the shaft 162 and the spur gear 178 thereon, in response to rotation of the shaft 158, moves the side-thrust arms 180 and 182 either toward or away from each other.

A second spur gear 190 is mounted on the shaft 162 relatively near the upper end thereof and is in engagement with a toothed portion 192 of a centering member or arm 194. The centering member 194 operates in a longitudinally extending slot 196 in the member 156 as shown most clearly in FIG. 8C. Due to the engagement of the spur gear 190 with the toothed portion 192, rotation of the shaft 162 and the spur gear 190 moves the centering arm 194 in the slot 196. The assembly of the blade support arms, side thrust arms and centering member, as illustrated most clearly in FIG. 4, positions the center of rotation of the base member 82 in substantial coaxial alignment with the center of the post 106 as will be explained more fully hereinafter.

A spring-loaded retrieving mechanism 198 is attached to the forward end of the track 32. The mechanism 198 includes a reel 200 having a length of cable 202 disposed thereon. The free end of the cable 202 is attached to the support member 34, and as the mowing attachment 14 moves rearwardly along the track 32, the cable 202 will be fed from the reel 200. A spring (not shown) disposed in the retrieving mechanism 198 constantly urges the reel 200 in a direction of rotation to rewind the cable 202. When the mowing attachment 14 reaches the rear-end of the track 32 as will be described more fully in connection with the operation of the device, the mechanism 198 returns the mowing attachment 14 to the forward end of the track 32 against the front stop 44.

As illustrated in FIG. 9, the hydraulic circuit utilized to drive the hydraulic motor 128 mounted on the base member 82, includes a hydraulic pump 204 connected by a conduit 206 with a throttling valve 208. A conduit 210 extends from the throttling valve 208 to the inlet side of the motor 128 and a conduit 212 extends from the motor to a hydraulic reservoir 214. The suction side of the pump 204 is connected by a conduit 216 with the reservoir 214 completing the hydraulic circuit. Preferably, the pump 204 is mounted on the tractor 12 and is driven by a power takeoff located thereon. The throttling valve 208 should be mounted on the tractor 12 where it can be conveniently reached by the tractor operator.

A hydraulic circuit for controlling the cylinders 22 and 26 is shown in FIG. 10 and may be supplied with hydraulic fluid by the same pump 204 if desired. As illustrated, the pump 204 has its outlet connected by means of conduits 218 and 220 with four-way valves 222 and 224, respectively. The four-way valves 222 and 224 are of the commercially available type and can be positioned to cause fluid flow therethrough to follow either the solid or the dash-line arrows shown in FIG. 10. Also, the valves 222 and 224 should include means (not shown) for controlling the pressure to the cylinders 22 and 26 so that the pistons 24 and 28 disposed therein can be positioned as desired. The four-way valve 222 is connected with the cylinder 22 by conduits 226 and 228 and with the fluid reservoir 214 by conduit 230. The valve 224 is connected with the cylinder 26 by conduits 232 and 234 and with the reservoir 214 by a conduit 236.

*Operation*

When the tractor 12 is being driven to the area in which mowing is to be performed, the mowing attachment 14 is elevated to the position illustrated by dashed-lines in FIG. 3. Upon reaching the area to be mowed, the mowing attachment 14 is lowered to the position illustrated in solid lines in FIGS. 1, 2 and 3.

Lowering of the mowing attachment 14 is accomplished by actuating the four-way valve 222 to such a position that the hydraulic cylinder 22 and the piston 24 therein is extended downwardly, that is, the four-way valve 222 has a flow path therethrough as indicated by the solid arrows in FIG. 10. The four-way valve 224 is then actuated to extend the rod 28 of the cylinder 26 until the base member 82 is substantially parallel with the surface of the ground as shown in FIGS. 1, 2 and 3. If the surface to be moved is at a different angle than the surface upon which the tractor 12 is operating, the piston rod 28 in the cylinder 26 can be actuated to position the mowing attachment 14 relative to the ground so that the base plate 82 will be approximately parallel to the surface to be mowed.

After the mowing attachment 14 has been lowered, the valve 208 is adjusted to permit fluid to flow from the pump 204 to the hydraulic motor 128 causing the rotation of the pulley 127 (FIG. 5). Rotation of the pulley 127 is transmitted by the drive belt 126 to the pulley 124 and shaft 114, rotating the attached mower blade 112. Simultaneously, rotation is transmitted from the shaft 114 to the shafts 134 and 136 and the mower blades 130 and 132 attached thereto. Rotation is transmitted from the shaft 114 to the shaft 134 by the pulleys 122, 142 and the drive belt 144 extending therebetween. Likewise, rotation is transmitted from the shaft 114 to the shaft 136 by the pulleys 123, 146 and the drive belt 148 extending therebetween.

As previously mentioned, the blade guards 150 and 152 are biased inwardly by the spring 176 (FIG. 7) so that as the mowing attachment 14 approaches the post 106 they will be engaged thereby. Engagement of the post 106 with the blade guards 150 and 152 moves the blade guards 150 and 152 outwardly carrying the blade support arms 118 and 120 outwardly therewith (see FIG. 8A). As the blade support arms 118 and 120 move outwardly, the spur gear 164, which is in engagement with the toothed portions 170 and 172 on the blade support arms 118 and 120, respectively, causes the gear 164 and the shaft 158 attached thereto to rotate. As the shaft 158 rotates, the shaft 162 (FIG. 7) is also caused to rotate due to the action of the clutch 160.

Rotation of the shaft 162 rotates the spur gears 178 and 190 mounted thereon, moving the side thrust arms 180 and 182 (FIG. 8B) outwardly until the space therebetween is sufficient to receive the post 106 (FIG. 4). Simultaneously, the spur gear 190 causes a movement of the centering arm 194 (FIG. 8C) into a position engaging the post 106 (FIG. 4), whereby the center of the post 106 will be in the approximate center of rotation of the base member 82.

As the tractor 12 progresses forwardly, the post 106, which is in engagement with the side-thrust arms 180 and 182 and with the centering arm 194, exerts a force on the mowing attachment 14 tending to retain the mowing attachment 14 in a relatively fixed position with respect to the post 106.

Continued forward movement of the tractor 12 results in the track 32 moving relatively through the support assembly 34. Movement of the support assembly 34 along the track 32 rotates the spur gear 58 (FIG. 5) engaged with the toothed portion 42 of the track 32. Rotation of the gear 58 is transmitted through the gear box 54 to the mitre gears 60 and 64 resulting in the rotation of the telescoping shaft 70 and of the spur gear 78.

As the spur gear 78 rotates in engagement with the toothed portion 80 of the base member 82, the base member 82 will rotate about the center of rotation thereof and about the post 106 in a clockwise direction until the base member 82 has rotated 180 degrees as illustrated by the dash-lines in FIG. 1. Upon reaching this position additional forward motion of the tractor 12 carries the mowing attachment 14 free of the post 106 due to the engagement of the support assembly 34 with the rear stop 46 on the track 32.

When the mowing attachment 14 is clear of the post 106, the retrieving mechanism 198 which is attached to the support member 34 pulls the mowing attachment 14 forwardly along the track 32 until the mowing attachment 14 engages the front stop 44 on the track 32. As the mowing attachment 14 moves forwardly along the track 32, the base member 82 will be rotated in a counterclockwise direction until it again reaches the position shown in solid lines in FIG. 1. Upon reaching this position, the mowing attachment 14 is ready to engage another post.

If the mowing attachment 14 is to be used with only one size of post, the centering mechanism, comprising the side thrust arms 180, 182 and the centering arm 194 could be eliminated. It can be appreciated that the centering mechanism must be provided when the mowing attachment 14 is to be utilized with various post diameters. For example, if the centering mechanism were not provided, a post having a diameter other than the diameter for which the attachment was designed, upon entering the slot 106 would engage the blade guards 150 and 152 and, while the blades would adapt themselves to the size of the post, there would be no means provided to align the center of the posts with the center of the rotation of the base member 82 and unless such centering occurred by coincidence, the base member 82 may be prevented from rotating about the post.

Furthermore, the use of the one-way clutch 160 prevents a relative change between the center line of the post and the center of rotation of the base member 82 after the post has reached the centered position. As will be remembered from the structural description of the centering mechanism, the shafts 158 and 162 (FIG. 7) cannot rotate in response to a force exerted on the side thrust arms 180 and 182 or on the centering arm 194. Due to the locking of the shafts 158 and 162, a relative change between the center line of the post and the center line of the base member 82 is prevented during the rotation of the base member 82 about a post.

As an example of the operation of the centering mechanism, assume that a relatively small post enters the slot 104. Initially, the post engages the blade shields 150 and 152 spreading them apart. As the shields 150 and 152 spread, the shaft 158 rotates, rotating the shaft 162 causing the side thrust arms 180 and 182 to move relatively apart until they are a sufficient distance apart to receive the post therebetween.

Simultaneously, the centering arm 194 is moved in the slot 196 to engage and hold the post in a position wherein the center of the post and the center of rotation of the base member are axially aligned. At this time the post is in engagement with the side-thrust arms 180 and 182 and with the centering arm 194. As previously described, a force exerted against any of those members locks the shaft 158 against farther movement, thereby positively maintaining the axial alignment of the post and base member 82. Should the next post encountered be of a different diameter, the centering mechanism will function automatically to align the center of the post and base member 82 and to positively retain such alignment during the mowing of grass thereabout.

After completion of the mowing operation, the mowing attachment 14 can be raised into the position shown in dash-line in FIG. 3 for transport to another area by reversing the operation of the cylinders 22 and 26. If it is a relatively short distance to the next series of posts, the attachment 14 can be used to mow a swath along therebetween to avoid additional maneuvering of conventional mowers cutting the remainder of the grassy area.

It can be seen from the foregoing structural and operational description that the disposition of the blades 112, 130 and 132 as illustrated will result in the mowing of the gras completely around the post 106 as the base member 82 rotates thereabout. If desired, the apparatus could be provided with only the blade 130 which would result in the mowing of the grass at least half way around the post 106. Under such circumstances, it would be necessary to make a second pass from the opposite direction to complete the mowing around the post. However, with the three blades illustrated in the preferred form of the invention, it is possible not only to mow entirely around the post 106 as the tractor passes thereby but to mow a solid swath between adjacent posts.

As an additional feature of the invention, the lateral motion of the mowing attachment 14 has been provided. If it were possible for the driver of the tractor 12 to accurately engage the post 106 in the slot 104, such lateral motion would not be necessary. However, the lateral motion provided permits the base member 82 to shift laterally to position the slot 104 about the post 106 even though the driver may have been slightly out of alignment as he approached the post 106. By providing for lateral movement in two directions from a center position as previously described, the base member 82 will adjust automatically for misalignment in either direction, that is, to the left or right of the post 106.

Due to the change in spacing between adjacent posts, it is highly desirable to be able to change the ratio of the gears in the gear box 54 so that the 180 degree rotation of the base member 82 can be accomplished with less movement along the track 32. For example, in some instances, it is known that the adjacent post may be spaced by ten feet and in other instances that the posts may be spaced fifteen or twenty feet apart. Where such variation in the post spacing is to be encountered it is preferred that the gear box 54 be of the shiftable type such as a commercially available two or three speed transmission. With the use of the shiftable gear box, it can be seen that the driver will simply change to the ratio desired to cause the rotation of the base member 82 in the space allowed.

From the foregoing detailed description, it can be seen that the mowing apparatus 10 can be utilized to mow around and between a series of adjacent posts without maneuvering the tractor 12 as is necessary with conventional mowers or of starting and stopping the tractor 12 between posts. As the tractor 12 moves forwardly, the mowing attachment 14 engages the post and mows the grass thereabout. As soon as mowing is completed around the first post, the mowing attachment 14 is returned to the forward end of the track 32 and is ready for engagement with the next post as the tractor proceeds forwardly at a relatively low speed. By the use of mowing apparatus constructed in accordance with this invention it is possible to virtually eliminate the manual mowing of grass and weeds around posts.

The mowing attachment 14, in the preferred form, is constructed sufficiently low so that it will pass under guard rails installed on the posts 106 as illustrated in FIG. 5. Also, the mowing attachment 14 can be used with any height of post since there is no portion thereof which must pass over or straddle the post.

It should be understood that the embodiment described herein is presented by way of example only and that many modifications and changes can be made thereto without departing from the spirit of the invention or from the scope of the annexed claims.

What I claim is:

1. A mowing attachment for use with a vehicle to mow around posts and the like, comprising:
   a support means on said vehicle, said support means including an elongated support member mounted on said vehicle and a support frame slidingly mounted on said support member;
   a base member carried by said support frame and engageable with one of the posts, said base member being rotatable relative to said support frame, and said base member and support frame being movable along said elongated support member whereby when said base member engages a post, said base member may yield by movement of said base member and its associated support frame on said elongated support member;
   at least one mower blade carried by said base member and arranged to be disposed generally parallel to the surface of the ground; and,
   means operably connected with said mower blade for driving said mower blade.

2. A mowing attachment for use with a vehicle having a longitudinal axis to mow around posts and the like, comprising:
   elongated track means attached to the vehicle and extending generally parallel to the longitudinal axis of the vehicle;
   a support frame slidingly mounted on said track means for movement parallel to the axis of the vehicle;
   a rotatable base member carried by said support frame and operably engaged with said track means, whereby movement of said base member and support frame along said track means upon engagement of said base member with one of the posts, rotates said base member relative to said frame and track means;
   at least one mower blade carried by said base member and arranged to be disposed generally parallel to the surface of the ground; and,
   means operably connected with said mower blade for driving said mower blade.

3. A mowing attachment for use with a vehicle having a longitudinal axis to mow around posts and the like, comprising:
   elongated track means attached to the vehicle and extending generally parallel to the axis of the vehicle;
   an elongated toothed portion on said track means;
   a support frame slidingly mounted on said track means for movement parallel to the axis of the vehicle;
   a rotatable base member carried by said support frame and adapted to engage one of the posts, said base member having a toothed portion engaged with the toothed portion on said track means, whereby movement of said base member and support frame along said track means rotates said base member around the post and relative to said track means;
   at least one mower blade carried by said base member and arranged to be disposed generally parallel to the surface of the ground; and,
   means operably connected with said blade for driving said mower blade.

4. The mowing attachment of claim 3 and also including centering means carried by said base member and engageable with the post, whereby said base member has its center of rotation substantially coaxial with the center of the post.

5. The mowing attachment of claim 3 wherein said support frame is also movable on said track means laterally with respect to the axis of said vehicle, and whereby said blade and base member is adapted to be moved laterally upon engagement with one of the posts whereby said base member can rotate about the post.

6. The mowing attachment of claim 3 and also including an additional mower blade carried by said base member and driven by said driving means, said additional blade being disposed thereon in a position substantially on the opposite side of the post when said base member is in engagement with the post.

7. The mowing attachment of claim 3 and also including means mounted on said track means operably connected with said support frame for biasing said frame in a direction parallel to said axis and opposite to the direction of movement of said frame caused by engagement of said base member with the post.

8. The mowing attachment of claim 7
   wherein said base member is generally U-shaped, said base member having a pair of spaced leg portions connected by a base portion, the space between said leg portions being sized to at least accommodate one of the posts; and,
   wherein said attachment also includes two additional mower blades also carried by said base member, one of said blades being positioned in each of said leg portions and the other said blade being positioned in said base portion.

9. The attachment of claim 8 and also including:
   a shaft journalled in said base portion and connected with the blade carried thereby, said shaft being connected with said driving means;
   a pair of blade support arms having one end coaxially mounted with said shaft and each having a free end having the other blades journalled therein, said support arms being movable about said shaft whereby said free ends and the blades thereon can be moved relatively toward and away from each other to accommodate posts of varying sizes; and,
   spring means attached to said base member and said arms for biasing said arms relatively toward each other.

10. The attachment of claim 9 and also including centering means carried by said base member and operably connected with said blade support arms and engageable with the post disposed between said spaced leg portions, whereby the center of rotation of said base member is substantially coaxial with the center of the post.

11. The attachment of claim 10 wherein said centering means includes:
   a first shaft journalled in said base member;
   a second shaft also journalled in said base member and disposed in end-to-end relationship with said first shaft;
   clutch means mounted in said base member and connecting adjacent ends of said first and second shafts to permit rotation of said second shaft in response to rotation of said first shaft, but to prevent rotation of either shaft when an attempt is made to rotate said second shaft;

first and second toothed gears mounted on said second shaft;

a pair of oppositely disposed side thrust arms slidingly mounted in said base member and engageable with said first toothed gear, whereby a force exerted on either of said side thrust arms attempts to rotate said second shaft;

a centering arm slidingly mounted in said base member and engageable with said second toothed gear, whereby a force exerted on said centering arm attempts to rotate said second shaft;

a third toothed gear mounted on said first shaft and engageable with said blade support arms, whereby a force exerted on said blade support arms causes rotation of said first and second shafts, movement of said side thrust arms. and movement of said centering arm in response to the movement of said blade support arms to position the center of rotation of said base member substantially coaxially with the center of the post engaged thereby.

12. Apparatus for moving around posts and the like, comprising, in combination:

a self-propelled vehicle having a longitudinal axis generally parallel to the direction of movement of the vehicle;

elongated track means attached to the vehicle and extending generally parallel to the longitudinal axis of the vehicle;

a support frame slidingly mounted on said track means for movement parallel to the axis of the vehicle;

a rotatable base member carried by said support frame and operably engaged with said track means whereby movement of said base member and support frame along said track means upon engagement of said base member with one of the posts moves said base member along said track means to rotate said base member relative to said frame and track means;

at least one mower blade carried by said base member and arranged to be disposed generally parallel to the surface of the ground; and, means operably connected with said mower blade for driving said mower blade.

13. Apparatus for mowing around posts and the like, comprising, in combination:

a self-propelled vehicle having a longitudinal axis generally parallel to the direction of movement of the vehicle;

elongated track means attached to the vehicle and extending generally parallel to the axis of the vehicle;

an elongated rack gear mounted on said track means;

a support frame slidingly mounted on said track means for movement parallel to the axis of the vehicle;

a rotatable base member carried by said support frame and adapted to engage one of said post, said base member having a toothed portion engaged with said rack gear, whereby movement of said base member and support frame along said track means rotates said base member around said post and relative to said track means;

at least one mower blade carried by said base member and arranged to be disposed generally parallel to the surface of the ground; and, means operably connected with said blade for driving said mower blade.

References Cited by the Examiner

UNITED STATES PATENTS

| | | | |
|---|---|---|---|
| 1,414,319 | 4/1922 | Zaiauskis | 143—43.34 |
| 2,651,249 | 9/1953 | Morkowski | 172—24 |
| 2,838,901 | 6/1958 | Davis. | |
| 3,045,413 | 7/1962 | Sheffer | 56—25.4 |
| 3,115,739 | 12/1963 | Thoen et al. | 172—38 X |
| 3,183,651 | 5/1965 | Hoefler | 172—38 X |

ANTONIO F. GUIDA, *Acting Primary Examiner.*

RUSSELL R. KINSEY, ABRAHAM G. STONE,
*Examiners.*

M. C. PAYDEN, *Assistant Examiner.*